US008037081B2

(12) United States Patent
Douglis et al.

(10) Patent No.: US 8,037,081 B2
(45) Date of Patent: Oct. 11, 2011

(54) METHODS AND SYSTEMS FOR DETECTING FRAGMENTS IN ELECTRONIC DOCUMENTS

(75) Inventors: Frederick Douglis, Basking Ridge, NJ (US); Arun Kwangil Ivengar, Yorktown Heights, NY (US); Lakshmish Macheeri Ramaswamy, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 10/458,561

(22) Filed: Jun. 10, 2003

(65) Prior Publication Data

US 2004/0260676 A1    Dec. 23, 2004

(51) Int. Cl.
    G06F 7/00      (2006.01)
    G06F 17/30     (2006.01)
(52) U.S. Cl. .......................... 707/755; 707/797; 707/802
(58) Field of Classification Search .................. 715/513; 707/101, 102, 104.1
    See application file for complete search history.

(56) References Cited

U.S. PATENT DOCUMENTS

| | | | | |
|---|---|---|---|---|
| 5,987,467 | A * | 11/1999 | Ross et al. ............................. | 1/1 |
| 6,230,155 | B1 * | 5/2001 | Broder et al. ....................... | 707/3 |
| 6,359,633 | B1 * | 3/2002 | Balasubramaniam et al. ............................. | 715/760 |
| 6,738,678 | B1 * | 5/2004 | Bharat et al. ..................... | 700/48 |
| 6,839,714 | B2 * | 1/2005 | Wheeler et al. ....................... | 1/1 |
| 2003/0237047 | A1 * | 12/2003 | Borson .......................... | 715/513 |

OTHER PUBLICATIONS

G. Cobena, S. Abiteboul, and A. Marian. Detecting Changes in XML Documents. In Proceedings of ICDE-2002, Feb. 2002.*
S. Chawathe, H. Garcia-Molina. Meaningful Change Detection in Structured Data. Air Force Wright Laboratory Aeronautical Systems Center, 1997.*
Gregory Cobena et al., "Detecting Changes in XML Documents", 2002, Proceedings of the 18th International Conference on Data Engineering, pp. 1-12.*
U.S. Appl. No. 10/055,586, filed Jan. 22, 2002, Bar-Yossef et al., "Method and System for Improving Data Quality in Large Hyperlinked Text Databases Using Pagelets and Templates".
J. Challenger et al., "A Publishing System for Efficiently Creating Dynamic Web Content," Proceedings of IEEE INFOCOM 2000, 10 pages, May 2000.
A. Broder, "On the Resemblance and Containment of Documents," Proceedings of SEQUENCES-97, pp. 1-9, 1997.
U. Manber, "Finding Similar Files in a Large File System," Proceedings of USENIX-1994, pp. 1-10, Jan. 1994.

* cited by examiner

*Primary Examiner* — Tim T Vo
*Assistant Examiner* — Sangwoo Ahn
(74) *Attorney, Agent, or Firm* — Preston J. Young; Ryan, Mason & Lewis, LLP (57) ABSTRACT

Techniques for automatically detecting similar subsets (e.g., fragments) in electronic documents such as dynamic content-based data, e.g., web pages. The techniques of the invention may perform a systematic analysis of the web pages with respect to one or more of their information sharing behavior, their personalization characteristics, and their change pattern over time. Thus, the invention may be applied to discover fragments in web pages of web sites that are most beneficial for caching the contents of the web site. The present invention also comprises techniques for publishing electronic documents with automatic fragment detection.

32 Claims, 7 Drawing Sheets

| FIELDS IN AF TREE NODES | |
|---|---|
| FIELD NAME | EXPLANATION |
| NODE-ID | A VECTOR INDICATING A POSITION OF THE NODE IN THE A-F TREE |
| NODE-VALUE | A STRING, INDICATING A VALUE OF THE NODE. THE VALUE OF LEAF NODE MAY COMPRISE THE TEXT OF THE NODE. FOR INTERNAL NODES IT MAY BE NULL. |
| SUBTREE-VALUE | A STRING WHICH MAY BE A CONCATENATION OF THE SUBTREE-VALUES OF NODE'S CHILDREN AND ITS OWN NODE-VALUE. |
| SUBTREE-SIZE | INDICATES THE SIZE OF SUBTREE-VALUE |
| SUBTREE-SIGNATURE | AN ENCODING OF THE SUBTREE-VALUE FOR FAST COMPARISON. SHINGLES MAY BE ADOPTED FOR THIS PURPOSE. |

210 — NODE-ID
212 — NODE-VALUE
214 — SUBTREE-VALUE
216 — SUBTREE-SIZE
218 — SUBTREE-SIGNATURE

METHODS AND SYSTEMS FOR DETECTING FRAGMENTS IN ELECTRONIC DOCUMENTS

FIELD OF THE INVENTION

The present invention relates to techniques for processing data such as, for example, dynamic content-based data associated with information networks such as the Internet or World Wide Web, and, more particularly, to methods and systems for automatically detecting fragments in such dynamic content-based.

BACKGROUND OF THE INVENTION

It is known that the amount of dynamic content on the Internet or World Wide Web (WWW or the "web") is increasing at a rapid pace. Most web sites today provide personalized and user-specific information in web pages. Further, the contents of some web sites are highly dynamic. This increase in dynamic content has posed new challenges to the scalability of the World Wide Web due to two important reasons:

(1) Generating dynamic content involves executing programs, such as Perl scripts, on the server. Executing these scripts on the server consumes considerable amounts of computation time and resources. Further, generating dynamic web pages often results in one or more accesses to back-end databases. Hence, there is a need for interactions among the web server, the application server and the database server. These factors significantly increase the computational load on the web servers, which not only increases the average user latency, but may also cause the server to drop requests.

(2) Increasing dynamic content has significantly reduced the amount of content on the web that can be cached. This reduction in cacheable content has caused a noticeable increase in the number of requests that reach the origin web servers.

These factors have adversely impacted the average latency experienced by web users. Hence, there is a growing demand for techniques and systems that are capable of efficiently generating and serving dynamic web data.

There has been considerable research towards alleviating this problem. One of the promising research directions in recent years is fragment-based publishing, delivery and caching of web pages. The research on fragment-based publishing and caching has been prompted by the following observations on the nature of the dynamic web pages and web sites serving them:

(1) Web pages seldom have a single theme or functionality. Usually web pages have several pieces of information whose themes and functions are independent of each other.

(2) Generally, dynamic and personalized web pages are not completely dynamic or personalized. Usually the dynamic and personalized content are embedded in relatively static web pages.

(3) Web pages from the same web site tend to share information among them.

These observations have led to fragment-based publishing, wherein the web content is published and cached at a finer granularity than that of the entire web page. Challenger et al., "System for Efficiently Creating Dynamic Web Content," Proceedings of IEEE INFOCOM 2000, May 2000, the disclosure of which is incorporated by reference herein, describes an example of the fragment-based publishing technique.

Some advantages of fragment-based publishing and caching include: (i) increasing the cacheable content of a web site by separating the non-personalized content from the personalized content and marking them as such; (ii) reducing the amount of data invalidations occurring in caches; and (iii) improving the disk-space utilization at caches.

There have been considerable research efforts on the performance and benefits of the fragment-based publishing and caching of web pages. However, existing approaches for fragment-based web site design assume that the web pages are fragmented manually at their respective web sites. However, manual fragmentation of web pages is known to not only be costly, but also error-prone.

Thus, a need exists for techniques which overcome the above-mentioned and other limitations associated with conventional web page fragmentation approaches.

SUMMARY OF THE INVENTION

The present invention provides techniques for automatically detecting fragments in electronic documents such as dynamic content-based data, e.g., web pages. By implementing automated detection techniques, the invention overcome the above-mentioned and other limitations associated with conventional web page fragmentation approaches.

In one aspect of the invention, a technique for detecting similar subsets (e.g., fragments) in at least one electronic document comprises the following steps/operations. The at least one document is parsed into at least one tree comprised of a plurality of nodes. Nodes of the at least one tree are then grouped based on sizes. Then, at least one subset of the at least one node similar to at least one subset of another node is determined.

In another aspect of the invention, a technique for detecting similar subsets in a plurality of versions of an electronic document comprises the following steps/operations. The plurality of versions are parsed into at least one tree comprised of a plurality of nodes. At least one node is examined to determine a subset s1 of the node similar to a subset s2 of another node. Differences between subset s1 and subset s2 are then determined.

In a further aspect of the invention, a technique for detecting fragments in at least one electronic document comprises the following steps/operations. The at least one document is parsed into at least one tree comprised of a plurality of nodes. A plurality of fragments are identified in which a fragment is comprised of at least one node. At least one ancestor fragment is maintained for at least one node such that the at least one ancestor fragment includes the node. A similarity between at least two fragments is determined.

The techniques of the invention may perform a systematic analysis of the web pages with respect to one or more of their information sharing behavior, their personalization characteristics, and their change pattern over time. Thus, the invention may be applied to discover fragments in web pages of web sites that are most beneficial for caching the contents of the web site.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative Internet or web implementation. However, it is to be understood that the present invention is not limited to such an information network architecture. Rather, the invention is more generally applicable to any fragment-based data publishing environment in which it would be desirable to perform fragment detection in a manner that reduces detection cost and/or errors.

Furthermore, while the illustrative embodiment of the invention is a fragment detection system for web pages, the invention could be applied to detecting fragments in other types of data objects as well. One skilled in the art could use the invention for detecting fragments encoded in a variety of different electronic document formats including, but not limited to, HTML (HyperText Markup Language) documents, XML (eXtensible Markup Language) documents, text documents in other formats, and binary documents. Also, the phrase "electronic document" as used herein may also be understood to comprise one or more of text data, binary data, one or more byte streams, etc. Thus, the invention is not limited to any particular type of data object.

As will be explained in illustrative detail below, the present invention provides novel methods and systems to automatically detect and flag possible fragments (referred to herein as "candidate fragments") in a web site. The invention can be applied to discover fragments in web sites that are most beneficial for caching the contents of the web site. The invention is based on a systematic analysis of web pages with respect to their information sharing behavior, their personalization characteristics and their change pattern over time.

As illustratively used herein, a "fragment" may be defined as any part of a web page. Thus, as illustratively used herein, a "candidate fragment" may be a part of a web page (or more generally a part of another fragment), which has a distinct theme or functionality associated therewith and is distinguishable from other parts of the web page. More particularly, a candidate fragment may be defined recursively as follows:

Each web page of a web site is a candidate fragment. A part of a candidate fragment is itself a candidate fragment if either of the two conditions is satisfied:

(1) The part is shared among "M" already-existing candidate fragments, where M is a configurable parameter >1.

(2) The part has different personalization or lifetime characteristics than those of its encompassing (parent or ancestor) fragment.

This definition is not only recursive, but also has two independent conditions. These conditions define fragments that benefit caching from two different and independent perspectives. The fragments satisfying condition (1) are termed "shared fragments" and the fragments satisfying the condition (2) are termed "lifetime-personalization fragments (denoted herein as L-P fragments). The lifetime of a fragment is the time duration for which the fragment, if cached, would stay fresh (in tune with the value at the server) in the cache. The personalization characteristics of a fragment correspond to the variation of the fragment in relation to cookies or parameters of the URL (uniform resource locator).

The two independent conditions in the candidate fragment definition correspond to two aims of fragment caching:

(1) By identifying parts of fragments that are shared across more than one fragment and creating fragments out of these parts, unnecessary duplication of information at the caches may be avoided.

(2) By creating fragments that have different lifetime and personalization properties, not only may the cacheable content be improved but also the amount and frequency of the information that needs to be invalidated may be minimized.

Figure 1:
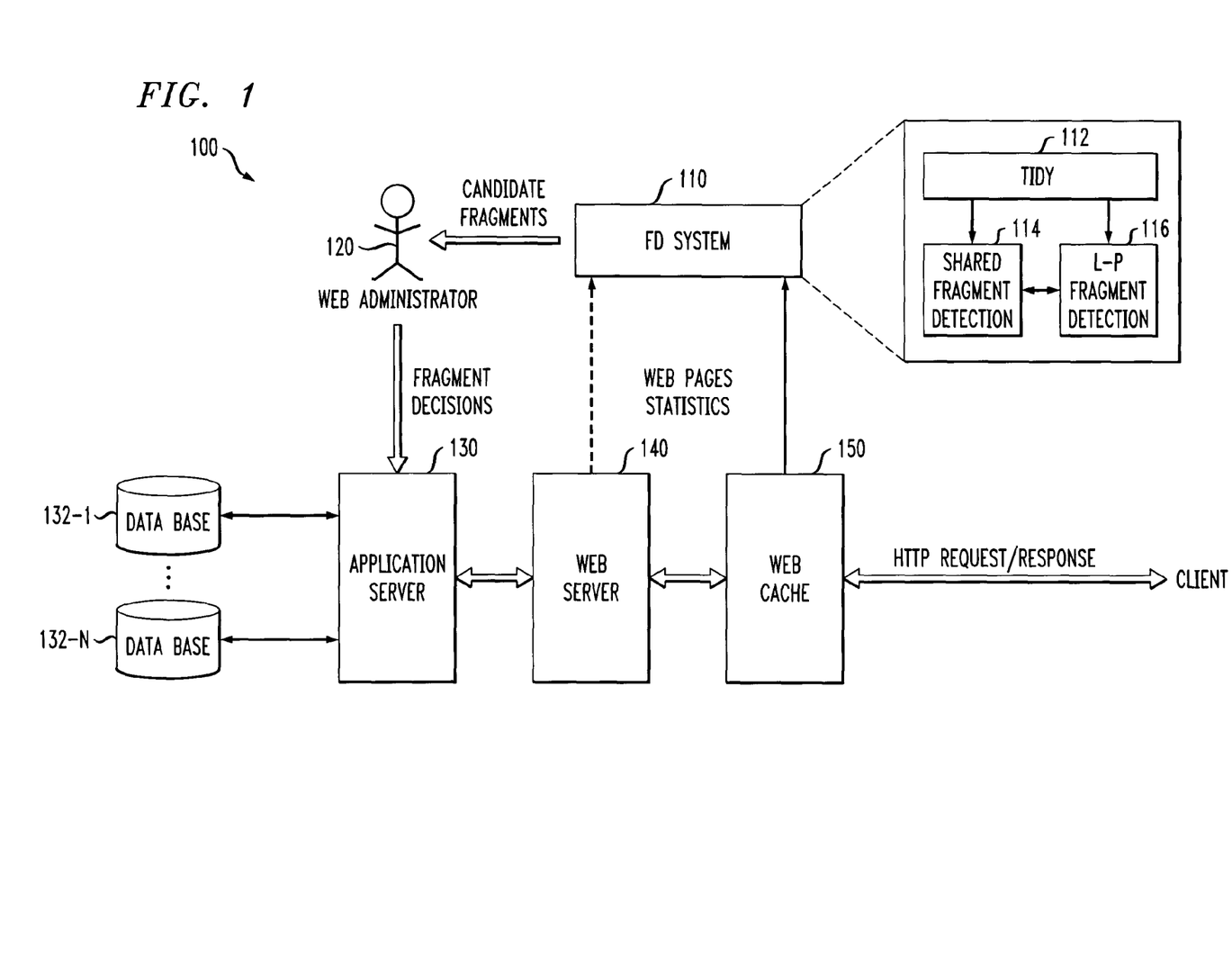
FIG. 1 is a block diagram illustrating an automated fragment detection system and a distributed computing environment in which the system may be implemented, according to an embodiment of the present invention.

Referring initially to FIG. 1, a block diagram illustrates an automated fragment detection system and a distributed computing environment in which the system may be implemented, according to an embodiment of the present invention. As shown, a computing environment 100 comprises a fragment detection (FD) system 110, a web administrator 120, an application server 130, databases 132-1 through 132-N, a web server 140 and a web cache 150. While only one web administrator, one application server, one web server and one web cache are shown for simplicity, it is to be understood that fragment detection system 110 may typically operate and/or interface with multiple such entities.

Web cache 150 may be a server-side cache, i.e., collocated with web server 140, although this is not required. Further, fragment detection system 110 can be collocated with web server 140 as well. Such design decision is motivated by availability of the data needed for the fragment detection.

As will be explained in detail below, fragment detection system 110 detects fragments by analyzing web page characteristics which may include sharing behavior, lifetime and personalization characteristics of a web page. Hence, the input to fragment detection system 110 comprises a collection of web pages. Further, a dynamic web page might change over time or based on a cookie associated with the generated the web page. Therefore, fragment detection system 110 may consider different versions of web pages that are generated over time or generated in response to different cookies.

These web pages and various versions of web pages may be readily available at a server-side cache such as web cache 150. Further, statistics such as access rates for web pages and invalidation rates for web pages can be gathered at several places including server-side caches (e.g., web cache 150) or web servers (e.g., web servers 140). These statistics can be used to predict the performance enhancements that can be obtained by fragmenting web pages. That is, once fragments are detected, the detected fragments along with these statistics of the web page usage are provided to web administrator 120. These statistics can aid web administrator 120 in assessing the benefits if the pages are fragmented. Thus, considering these factors, a preferred embodiment collocates fragment detection system 110 with server-side web cache 150 or with web server 140 (if a server-side cache is not available).

Accordingly, in general, fragment detection system 110 automatically detects fragments in web pages on the web server 140 and/or web cache 150 by analyzing characteristics associated with the subject web pages. As will be described in detail below, fragment detection system 110 performs methodologies that clean or "tidy" a web page (112) and that then detect candidate fragments that may include shared fragments (114) and/or L-P fragments (116). The candidate fragments (along with the web page statistics mentioned above, if available) may then be considered by web administrator 120 such that web pages may be authored with such fragments and made available to application server 130, via one or more of databases 132-1 through 132-N, for subsequent access via web server 140 and/or web cache 150.

Fragment detection system 110 may use a particular data model for web documents for efficient fragment detection. The particular data model is referred to herein as an "augmented fragment" tree (AF-Tree). An AF-Tree comprises a hierarchical representation of an HTML/XML document. An AF-Tree may be modeled on the lines of DOM (Document Object Model) tree models of a web document.

A DOM is a specification for an application programming interface (API) from the W3C (World Wide Web Consortium) that allows programs and scripts to update the content, structure and style of HTML and XML documents. Included in web browser software, a DOM implementation provides a core set of functions that let scripts access browser elements such as windows and history. Additional functions allow updating of HTML style sheets and XML content. DOM is especially useful for XML documents, because it converts the document in memory into a hierarchical node tree that looks like a database record.

However, the DOM tree may contain many nodes that correspond to text formatting tags (like <Big>, <Bold>, <I>, etc.). As the invention is concerned with the general structure of the document, AF-Tree contains nodes corresponding to content structuring tags (like <BODY>, <TABLE>, <P>, etc.) of the document.

Figure 2A:
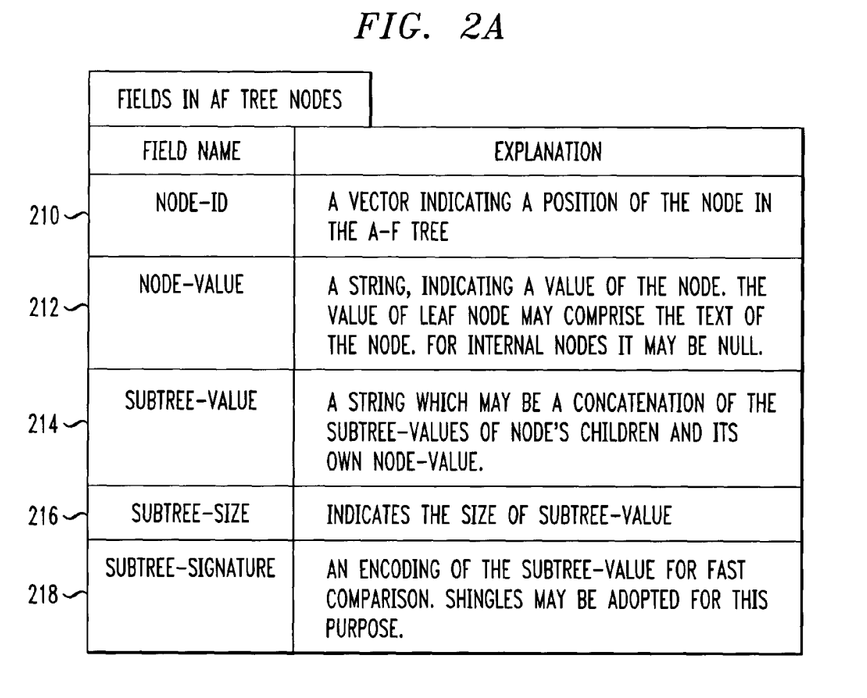
FIG. 2A is a diagram illustrating examples of fields in augmented fragment tree nodes, according to an embodiment of the present invention.

Referring now to FIG. 2A, a diagram illustrates examples of fields in AF tree nodes, according to an embodiment of the present invention. The nodes of an AF-Tree may include, but are not limited to, the five fields shown in FIG. 2A.

The Node-Id field (210) of a node comprises a vector indicating the location of the node in the AF-Tree relative to the root node. The Node-Value field (212) comprises a string denoting the value of the particular node. The Node-Value is analogous to the Value of a node in a DOM tree. The value of a leaf node comprises the text itself and the value of an internal node may be NULL (empty string).

The Subtree-Value field (214) comprises a string that may be defined recursively. For a leaf node, the Subtree-Value may be equal to its Node-Value. For internal nodes, the Subtree-Value may be a concatenation of the Subtree-Values of one or more (preferably all) of its children nodes and its own Node-Value. The Subtree-Value of a node can be perceived as a fragment (content region) of a web document anchored at this node. The Subtree-Size field (216) comprises a value which may be the length of the Subtree-Value. This may represent the size of the structure in the document being represented by this node.

The Subtree-Signature field (218) may be an encoding of the Subtree-Value for fast comparison. Shingles (as described in A. Broder, "On Resemblance and Containment of Documents," Proceedings of SEQUENCES-97, 1997, and U. Manber, "Finding Similar Files in a Large File System," Proceedings of USENIX-1994, January 1994, the disclosures of which are incorporated by reference herein) may be used as signatures of the Subtree-Values in nodes and, hence, Subtree-Signature is also referred to as Subtree-Shingles. Shingles may be used for fast comparison of strings. Shingles may be used for measuring the resemblance and containment between strings.

The following description explains a procedure for computing shingles in hierarchical fashion for strings with structures such as trees. This technique is incremental in its approach and reuses the previously computed shingles. This computation technique is referred to as the HiSh methodology (HiSh stands for Hierarchical Shingles). An aim of this methodology is to avoid multiple repeated calculations while computing shingles of a string and its substrings. The HiSh methodology can be applied in applications where shingles have to be repeatedly computed on strings organized in hierarchical structures such as trees. The methodology emerges from the relationship between shingles of a string and shingles of its substrings.

The HiSh methodology computes the Subtree-Shingle value for each node in an AF tree. For a leaf node, the methodology computes shingles of its Node-Value directly. For an internal node, the methodology computes its Subtree-Shingle value by utilizing the shingles of its children nodes.

Before presenting the HiSh methodology, we discuss observations and design ideas associated with the methodology. Consider a string $A=A_1A_2A_3 \ldots A_nA_{n+1} \ldots A_m$ with m tokens, $m \geq 1$. Let B and C be two non-overlapping substrings of A such that A is a concatenation of B and C. Let $B=A_1 A_2 \ldots A_n$, and $C=A_{n+1} A_{n+2} \ldots A_m$. Now, if we want to compute shingles of window size W on string A, we could consider all subsequences of length W of string A. There are (m−W+1) subsequences of length W. The shingles computation process then computes the hashes on these subsequences and generated random permutations of these hashes. The next step in the shingles computation is to retain minimum S of these randomly permuted hashes, where S is a pre-specified sample size. This can be represented as $Shng(A, W, S) + Min_S [RP(A_{(j,j+W-1)})|1 \leq j \leq (m-W+1)]$. Here, $Min_S[R]$ is a function that retains the S minimum values from the set R and $A_{(k,l)}$ indicates a substring of A starting at the $k^{th}$ token in A and ending at the $l^{th}$ token.

The W-subsequences in A that are not present in the W-subsequences of B or C are those that begin in B and end in C. We call these overlapping sequences. Let us represent the randomly permuted hashes of these subsequences as OvlpRP i.e., $OvlpRP=\{RP(A_{(n-W+2,n+1)}), RP(A_{(n-W+3,W+2)}), \ldots RP(A_{(m,m+W-1)})\}$.

It can be observed that:

$$Shng(A,W,S) = Min_N\{Shng(B,W,S) \cup Shng(C,W,S) \cup OvlpRP\}.$$

Figure 2B:
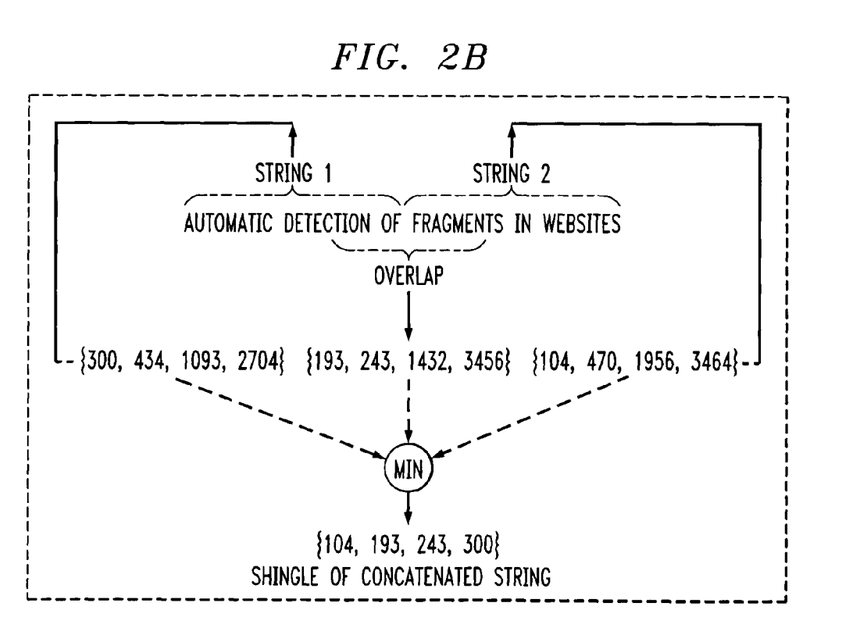
FIG. 2B is a diagram illustrating a hierarchical shingles methodology, according to an embodiment of the present invention.

As the shingles of B and C are available, the extra computations needed are computing the hashes of overlapping sequences and the random permutations on these hashes. This observation leads us to HiSh methodology. Illustrative pseudo code of the methodology is as follows:

INPUT:

Strings: {$Strng_1$, $Strng_2$, ...$Strng_N$}
Shingles: {$Shng_1$, $Shng_2$, ...$Shng_N$}
Window Size: W
Sample Size: S OUTPUT:
Shingle of $Strng_1.Strng_2 \ldots Strng_N$, the concatenated string
PROCEDURE:

If (N = 1 and Leaf ($String_N$) = true) then
    FinalShingles ⇐$Shng_N$ ⇐Shingle($String_N$)
else
    for i = 0 to (N – 1) do
        {/ *Compute the Overlapping sequence between $Strng_i$ and $Strng_{(i+1)}$ * /}
        Ovlp(i) ⇐$Strng_i[Ln_i – W + 1, Ln_i].Strng_{(i+1)}[1, W – 1]$
        {/ *Compute the Hash Function and Random Permutation of Ovlp(i) * /}
        $SubSqShng_i$ ⇐Shingle($Ovlp_i$)
    end for
    {/ *Retain minimum S of the union of all the shingles*/}
    FinalShingles ⇐$Min_S\{(\cup_{i+1}^{N} Shng_i) \cup (\cup_{i=0}^{N-1} SubSqShng_i)\}$
end if We also illustrate the HiSh methodology through an example in FIG. 2B. In this example, we are interested in computing the shingles of window size eight and sample size four of the string "Automatic Detection of Fragments in Websites". However, the string is a concatenation of two strings "Automatic Detection of" and "Fragments in Websites", whose shingles are already available. Then, all that needs to be done is to compute the hash values of the sequences which overlap between the two strings and randomly permute them. The region of the overlap is shown in FIG. 2B. The randomly permuted hash values are indicated below the overlapping region. In order to generate the final shingles set, the methodology retains the minimum four values from the union of these three sets of values.

This optimization saves the cost of repeated computation of the subsequences and random projections by computing only the required subsequences and their random projection and reusing the shingles of B and C that are already available. It is to be noted that this optimization works particularly well when the number of retained shingles is constant at all nodes in the AF tree.

Experiments indicate that this optimization can bring down the number of hashes computed in constructing the AF tree by as much nine times and reduce the shingles computation time by around six times for average size documents.

Figure 3:
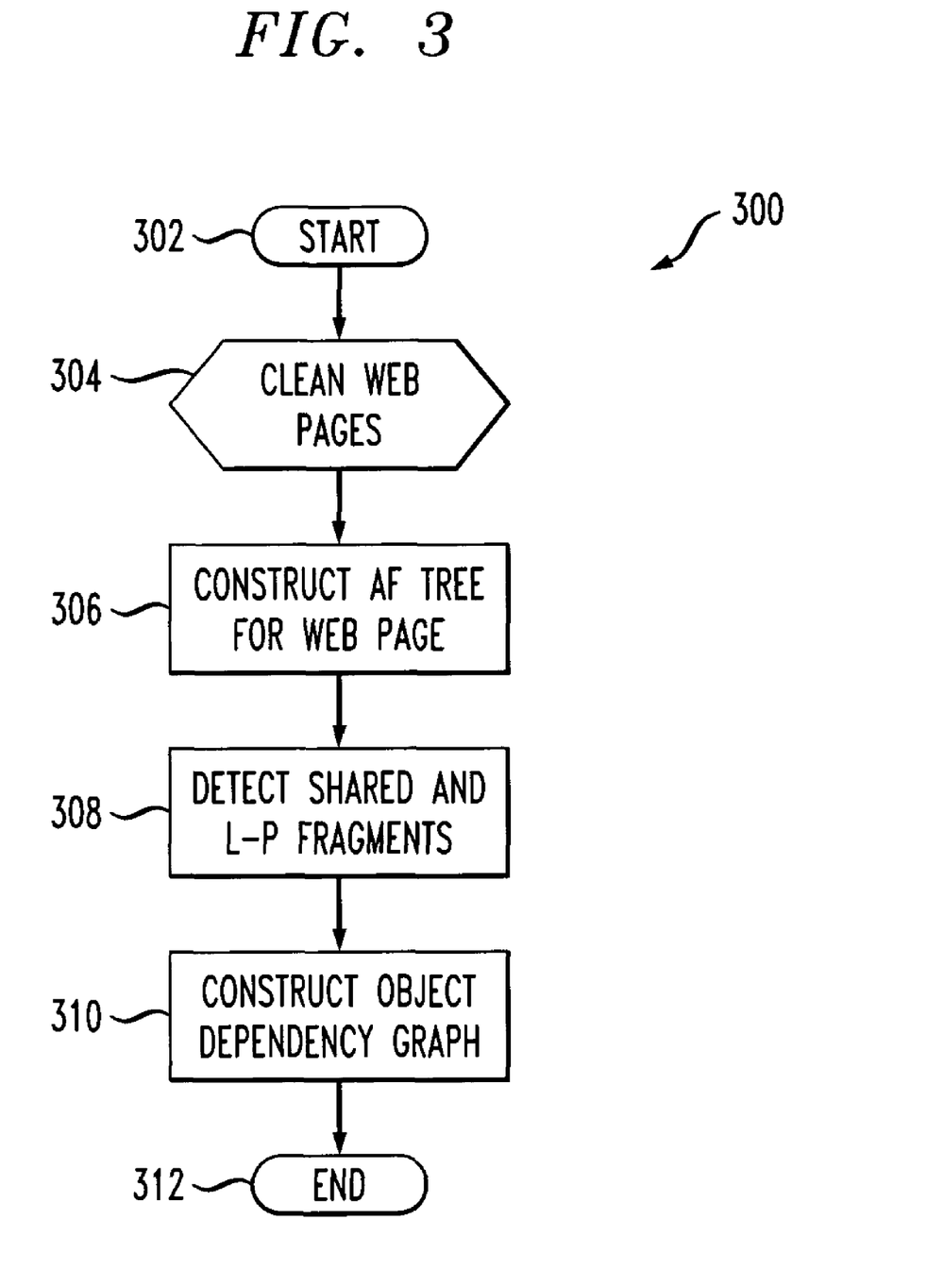
FIG. 3 is a flow diagram illustrating an automated fragment detection methodology, according to an embodiment of the present invention.

Referring now FIG. 3, a flow diagram illustrates an automated fragment detection methodology, according to an embodiment of the present invention. It is to be appreciated that the methodology 300 shown in FIG. 3 may be implemented by fragment detection system 110 of FIG. 1. The input to the methodology includes web pages from fragments are to be detected. The output of the methodology includes the detected candidate fragments.

The methodology begins at block 302. In step 304, the input web pages are cleaned. Almost all web pages violate the HTML/XML (e.g., HTML 4.01 Specification, and XML 1.0 W3C Recommendation) specifications at least in a few places. The most common violation being that the page creators forget to include the closing tags for HTML elements in the web pages they create. This leads to 'dangling' tags with only open tags being present in the document. Before the methodology analyzes web pages for detecting fragments, the methodology verifies that pages conform to the HTML/XML specifications. Public domain software is available that "tidy" a given web page (i.e., corrects violations). "JTidy" (or HTML TIDY) is one example of such public domain software. The invention is not limited to any particular cleaning software and thus may use other software tools that clean web pages and make them compliant with HTML/XML specifications.

In step 306, the fragment detection methodology converts web pages to their corresponding augmented fragment trees (AF-Trees). The AF-tree can be constructed in two substeps.

The first substep of step 306 is to transform a web document to its fragment tree and prune the fragment tree by eliminating the text formatting nodes. It is a simple recursive procedure that visits one or more nodes in the tree recursively to determine if they correspond to one or more structural constructs. If not, the node may be eliminated. When a node is eliminated, all its children may be made the direct descendants of the node's parent (if the children themselves are to be retained in the tree). The result of this step is a specialized fragment tree that may contain only the content structure tags.

The second substep of step 306 is to annotate the fragment tree obtained in the first step with Node-ID, Node-Value, Subtree-Value, and Subtree-Shingle. To speed up the AF-Tree construction process, Subtree-Value and Subtree-Shingles of nodes can be computed as the AF-Tree is being constructed. The AF-Tree construction procedure preferably utilizes the above-described HiSh methodology.

Next, in step 308, the fragment detection methodology detects the two kinds of fragments, i.e., shared fragments and L-P fragments. Details of the shared fragment detection process are described below in the context of FIG. 4. Details of the L-P fragment detection process are described below in the context of FIGS. 5 and 6.

In step 310, the methodology constructs an object dependency graph (ODG) which represents a merger of the detected candidate fragments. The ODG may be used by the web administrator 120 of FIG. 1 to make fragment decisions with respect to subsequent web page publishing operations.

Figure 4:
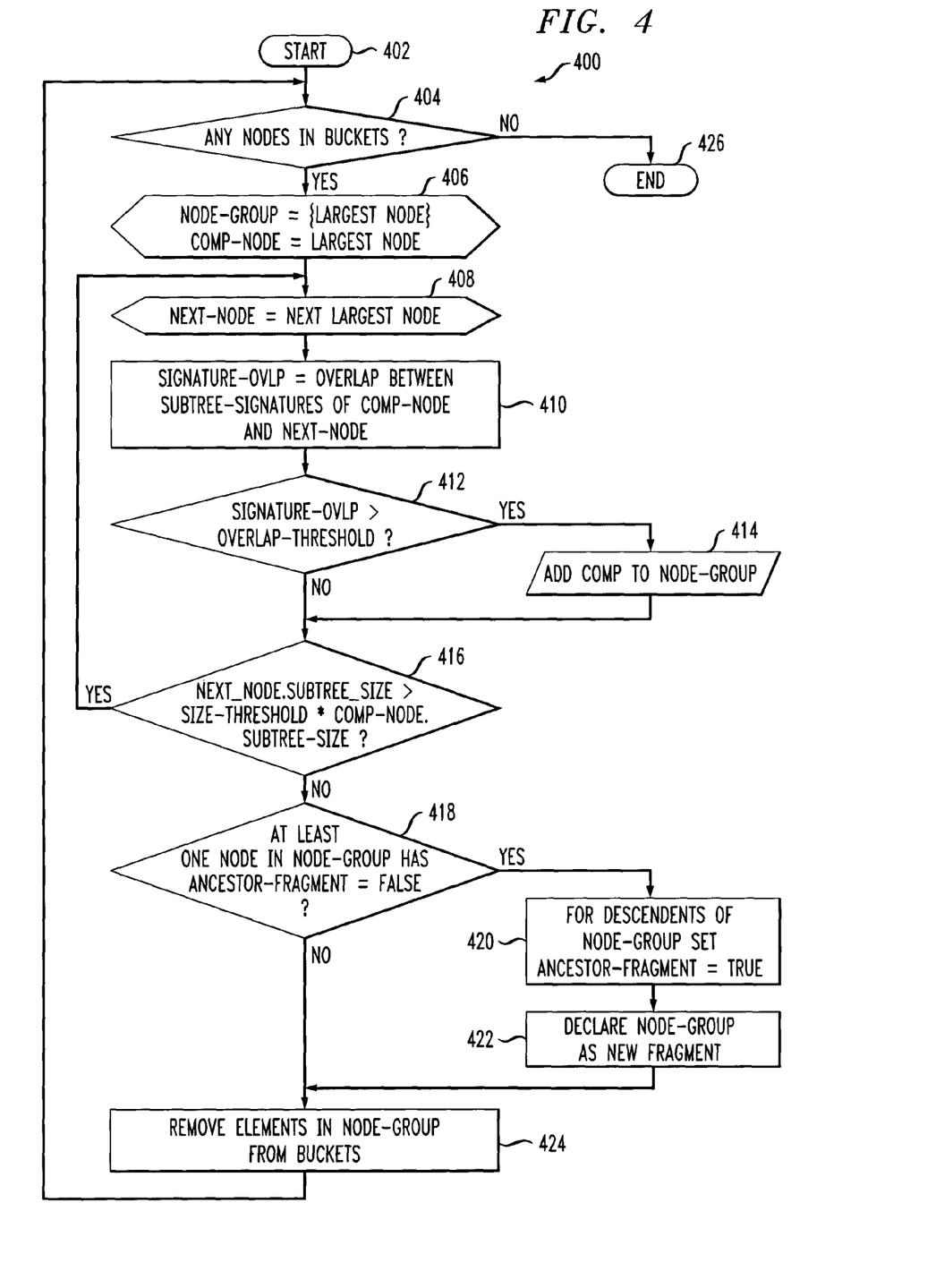
FIG. 4 is a flow diagram illustrating a shared fragment detection methodology, according to an embodiment of the present invention.

Referring now to FIG. 4, a flow diagram illustrates a shared fragment detection methodology, according to an embodiment of the present invention. In general. methodology 400 shown in FIG. 4 detects candidate fragments that are shared across multiple web pages (or more generally multiple pre-existing fragments).

Methodology 400 operates on various web pages which may be from the same web site. The methodology detects fragments that are "approximately" shared. The threshold of overlap for considering two strings to be "similar" can be specified as a parameter. The minimum size of the fragment can also be specified as parameter to the methodology.

In general terms, the shared fragment detection methodology creates a pool of nodes belonging to AF trees which might include all web pages of a web site. Then, the methodology processes nodes in the pool in decreasing order of their sizes. While processing a node, the node may be compared against other nodes in the pool and the nodes that are similar may be grouped together. The similarity between nodes may be measured by comparing their Subtree-Shingles. If the group has at least M nodes, then the group can be flagged as a fragment.

The shared fragment detection methodology may operate on the AF-Tree model of the web pages. Nodes in the AF-Tree may have the five fields as explained above. The methodology may also use additional fields such as the following:

Ancestor-Fragment: Indicates whether any ancestors of this node in the AF-Tree have already been detected as fragments. Initially this field is set to False for all the nodes. Ancestor-Fragment-Array: This is a vector of Fragment-IDs. This vector lists fragments to which ancestors of the node belong.

These two fields may be used to eliminate duplicate and/or trivial fragments (i.e., the fragments that are not maximally shared).

The chief data structures used in the shared fragment detection methodology are buckets. As explained below, buckets are used for efficient sorting of the nodes based on their sizes. A bucket may have a preset minimum size and maximum size, respectively known as Min-Size and Max-Size.

The shared fragment detection methodology starts (block 402 of FIG. 4) by placing nodes of a possibly modified DOM trees into appropriate buckets. The procedure may start at the root of a node. As previously mentioned, the minimum size of detected fragments can be specified as a parameter. We call this parameter the Size-Threshold. While processing a node, the methodology may check if the Subtree-Size of the node exceeds the Size-Threshold. If it does, then the node is placed in an appropriate bucket based on its size. Node-A may be placed in Bucket-J if Bucket-J.Min-Size≦Node-A.Subtree-Size<Bucket-J.Max-Size. While placing the nodes in the buckets, a bucket may be sorted based on the size of the nodes. Documents are processed through this procedure and placed in appropriate buckets at appropriate positions. Once document nodes have been processed, the actual process of fragment detection may begin, which is explained below.

In step 404, for a given bucket, it is determined whether any nodes are in the bucket. Assuming there are nodes in the given bucket, the fragment detection procedure may start from the largest node and progress towards the smallest node. The methodology groups the nodes that are "similar" to each other. The similarity between two nodes may be detected by several methods.

An exemplary method is the extent of overlap between their shingles. The methodology creates a new node group and the largest node present in the bucket is included in the group (step 406). Then, the methodology compares the node assigned to the node group with nodes, whose Subtree-Sizes fall within some prefixed threshold. For example, it may be decided that only nodes whose sizes are at least 75 percent of the Subtree-Size of the largest node will be compared. The decision to compare with nodes that are within some size range is intuitive. The methodology is searching for similar nodes, and it would not be expected that a node is similar to another node whose size differs drastically from its own size. It is straightforward to see that limiting the number of comparisons improves the efficiency of the shared fragment detection methodology.

While comparing the nodes to the largest node (the initial node in the node group), the methodology may compare shingles of nodes to those of the largest node (steps 410 and 412). If two shingles overlap more than a predefined threshold (called the Overlap-Threshold), the node under consideration may be considered to be similar to the largest node and added onto the node group (step 414). This comparison is done with nodes that fall in the size range.

After the comparison, a group of nodes is obtained that has a minimum of one node and possibly more nodes that are similar to a largest node in the buckets. If the node group has only one node in it (step 416), this means that there are no nodes detected which are similar to the largest node. Hence, a fragment with the largest node in it is not detected. Therefore, the largest node is removed from the bucket and the whole procedure repeats with the next largest node (step 408).

If, on the other hand, the node group has more than one node (step 416), then this means that there are nodes "similar" to the largest node and hence there is a possibility of a fragment being detected. It should however be noted here that just the existence of similar nodes does not necessarily guarantee a fragment being detected. There are additional tests that can be performed to ascertain whether the node group is truly a fragment. These tests may result from the fact that if a set of nodes were detected as fragments, most of their descendant nodes would again be similar to each other. If the methodology were to blindly declare the node group as a fragment, the methodology might end up detecting several "trivial" fragments. To avoid detecting these "trivial" fragments, the following tests may be performed.

The first test is to check whether one or more nodes in the node group has its Ancestor-Fragment set to False (step 418). If at least one node has its Ancestor-Fragment set to False, this means that none of its ancestors have been detected as fragments. Hence, this node group is indeed a fragment. Therefore, the node group is declared as a fragment (step 420 and 422).

If all the nodes in the node group had their Ancestor-Fragment set to true, this means that, for all nodes in the node group, at least one of their ancestors has been detected as a fragment. So another test would be to ascertain whether their ancestors belonged to the same fragments. This may be done by comparing the Ancestor-Fragment-Array of the nodes in the node group. As explained above, this array holds the Fragment-IDs of the fragments to which ancestors of the node belong. If the Ancestor-Fragment-Arrays of all the nodes are identical, then this means that all the ancestors belong to exactly the same fragments. This in turn means that these nodes are similar, as their ancestor were similar. But no new node has been discovered whose ancestor belonged to a different fragment. Hence, this node group is not declared as a fragment. If there existed at least one node that had a different Ancestor-Fragment-Array than the rest of the nodes, then the node group is declared as a fragment.

Once a decision is made whether a node group is a fragment or not, a few other actions may be taken depending on whether the node group is a fragment.

If the node group is a fragment, the fragment can be assigned an identifier (Fragment-ID). Fragment-IDs may be assigned in several ways. One method is to use monotonically increasing integers beginning from one. Then, the Ancestor-Fragment value of descendant nodes of nodes in the group is set to True. Also, this Fragment-ID is added to Ancestor-Fragment-Array for descendant nodes of nodes in the node group. Furthermore, nodes in the node group are removed from the buckets to which they belong (step 424).

If the node group does not satisfy the conditions for a fragment, the node group needs no processing except that the nodes in the node group are removed from their respective buckets (step 424).

The procedure may then continue in a similar fashion with the next largest node. The procedure ends when the buckets are empty (block 426).

The detailed description now turns to the L-P fragment detection methodology.

L-P fragments are parts of an already existing candidate fragment, which have different characteristics (including but not limited to lifetime or personalization characteristics) than those of the fragment they are contained in. Such fragments are detected by comparing different versions of already existing candidate fragments (web pages) and identifying the changes occurring among the different versions.

The input to the L-P fragment detection methodology may comprise various versions of the same web page (or more generally different versions of a pre-existing candidate fragment). The methodology compares two versions of a web page and detects fragments by identifying parts that change in value and/or in position. So, we describe one such step of detecting fragments between two web pages, Page-A and Page-B.

As in the case of shared fragment detection, the L-P fragment detection methodology may also work on the AF-Tree model of the web documents. Nodes in the AF-Tree may contain a field such as the following:

Status: A field indicating whether the node has changed or has remained unchanged. The field can take on values including the following: UNCHANGED, VALUECHANGED or POSITIONCHANGED. Initially, this field may be set to UNCHANGED.

The methodology to detect L-P fragments may operate in two passes. In the first pass, the methodology may mark the changes occurring between Page-A and Page-B. The second pass may detect the fragments and output them. Both these procedures may be recursive, starting at the root node of the two AF-Trees.

Figure 5:
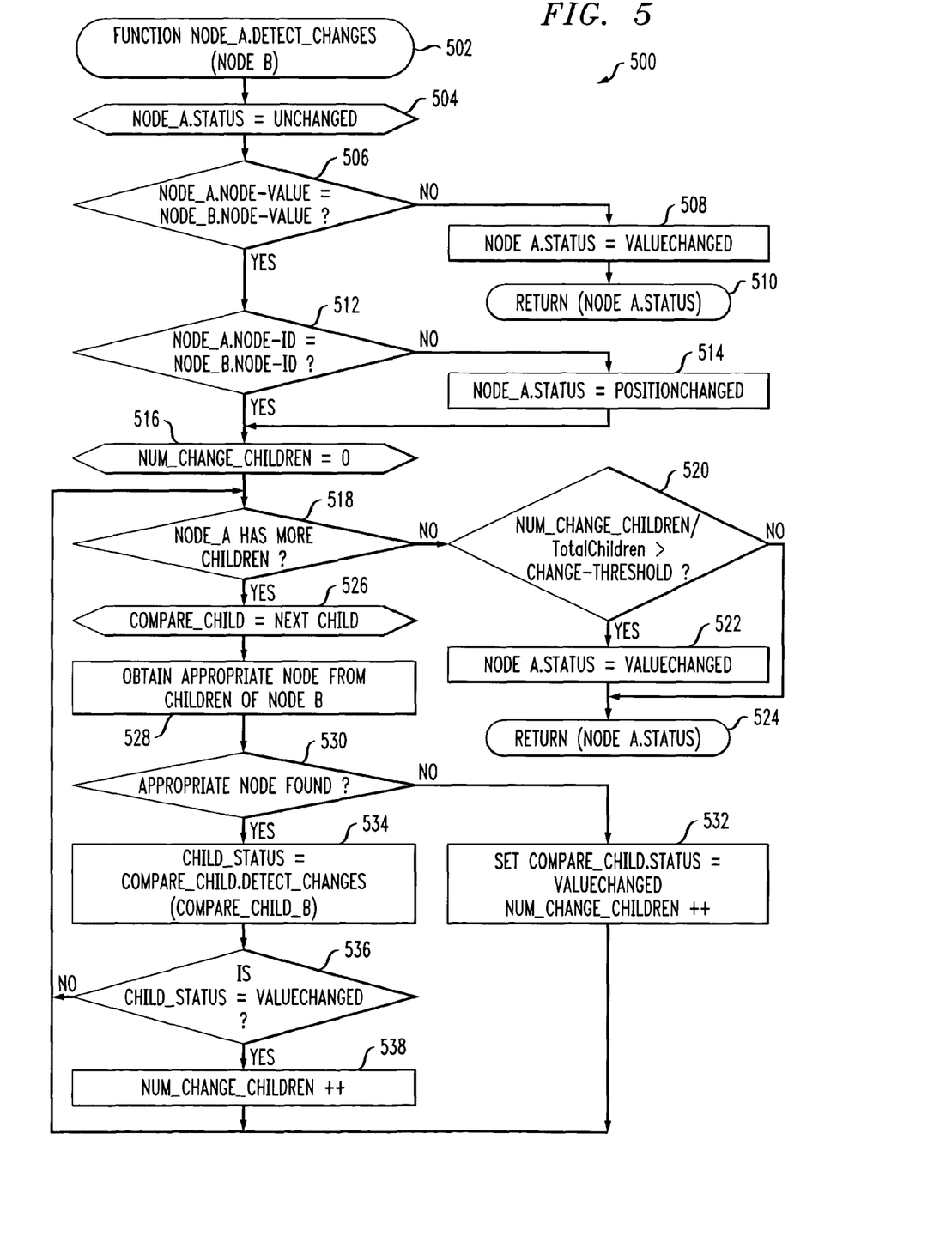
FIG. 5 is a flow diagram illustrating a first pass procedure of a lifetime-personalization fragment detection methodology, according to an embodiment of the present invention.

Referring now to FIG. 5, a flow diagram illustrates a first pass procedure of an L-P fragment detection methodology, according to an embodiment of the present invention.

This procedure 500 is recursive, starting at the root of the two pages. The flowchart depicts the procedure as invoked on nodes Node-A and Node-B from the AF-Trees of Page-A and Page-B, respectively. The procedure begins at block 502. The status field of Node-A is initially set to UNCHANGED (step 504).

At the outset, the procedure compares the Node-Value of Node-A and Node-B (step 506). If they differ from each other, then the Status of Node-A is marked as VALUECHANGED (step 508) and returns (step 510).

If the Node-Values of Node-A and Node-B are the same, then the procedure compares the position of Node-A and Node-B by comparing their respective Node-IDs (step 512). If they differ, the status is marked as POSITIONCHANGED (step 514). Otherwise, the status is UNCHANGED. In either case, the procedure may proceed as follows.

For a child node (Compare-Child) of Node-A, the procedure attempts to obtain an "appropriate" node from children of Node-B to compare with. By the term "appropriate," it is meant the node that is most similar to Compare-Child. Again, several methods may be used, including but not limited to Subtree-Shingles, to discover such a node from the children of Node-B. However, there might be no node similar to Compare-Child from the children of Node-B. This portion of the methodology is depicted in steps 516 through 528 as follows.

In step 516, Num_change_Children is initialized to zero. Step 518 checks whether there are any more children of Node_A, which have not been processed. If there are any unprocessed nodes, then the methodology proceeds to step 528. Else, the methodology flows to step 520.

Step 520 calculates the fraction of the children nodes of Node_A that have changed. If this fraction exceeds CHANGE-THRESHOLD, then the status of Node_A is marked as VALUECHANGED (in step 522). Otherwise, the status is left as it is (this would be UNCHANGED). This procedure terminates by returning the status to its parent node in step 524.

In step 526, the methodology obtains the next unprocessed child of A. In step 528, the methodology obtains a node from the children of B to compare the child of A that is being processed (Compare_Child defined in step 526).

If an appropriate node is found from the children of Node-B (step 530), then the procedure is recursively invoked on Compare-Child and Compare-Child-B (step 534). If the recursive invocation returns VALUECHANGED (step 536), Num-Changed-Children (indicating the number of changed children) is incremented (step 538). If the recursive invocation returns either POSITIONCHANGED or UNCHANGED, then Num-Changed-Children is not incremented.

If an appropriate node is not found from the children on Node-B, then the Compare-Child is marked as VALUECHANGED and Num-Changed-Children is incremented (step 532).

When the children of Node-A have been processed, the procedure calculates the ratio of the number of children that have changed to the total number of children of Node-A. If this ratio exceeds CHANGE-THRESHOLD, then the Status of Node-A is marked as VALUECHANGED. Otherwise, the procedure does not alter the value of Node-A.Status. The procedure returns the Node-A.Status.

This procedure is invoked on the roots of AF-Trees of Page-A and Page-B. At the end of this pass, nodes are marked as UNCHANGED, VALUECHANGED or POSITIONCHANGED.

Figure 6:
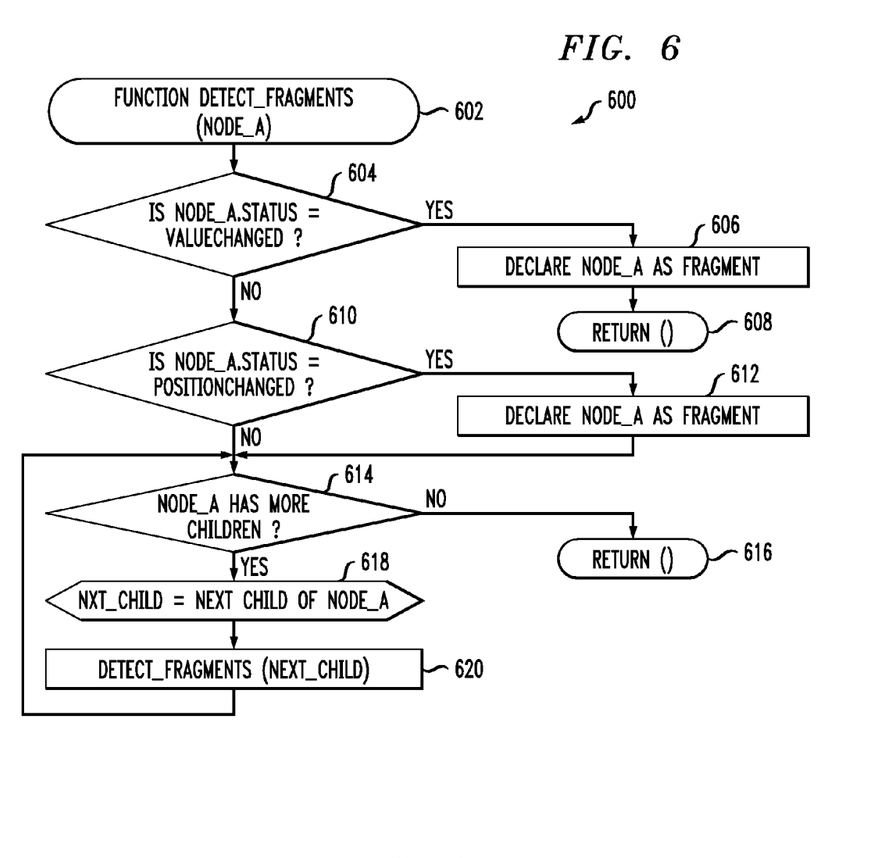
FIG. 6 is a flow diagram illustrating a second pass procedure of a lifetime-personalization fragment detection methodology, according to an embodiment of the present invention.

Referring now to FIG. 6, a flow diagram illustrates a second pass procedure of an L-P fragment detection methodology, according to an embodiment of the present invention. The second pass procedure 600 may output fragments from the AF-Trees. This is also a recursive procedure, starting at the root node of the AF-Tree. FIG. 6 depicts the procedure as invoked on an arbitrary node Node-A from Page-A (block 602).

The procedure visits nodes and checks the status field. If Node-A.Status is marked as VALUECHANGED (step 604), then the procedure outputs the Node-A as a fragment (step 606) and returns (step 608).

If the status of Node-A is POSITIONCHANGED (step 610), then Node-A is output as a fragment (step 612), but in this case, the same procedure is recursively applied on children of Node-A (in accordance with steps 614 through 620).

If the status of Node-A is UNCHANGED, Node-A is not detected as a fragment. The procedure is invoked on children of Node-A.

At the end of this pass, maximally changed portions of the web page are discovered, which are output as fragments.

Figure 7:
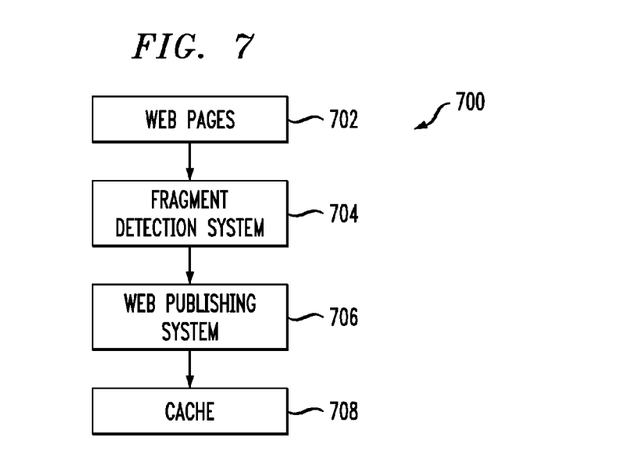
FIG. 7 is a block diagram illustrating a web content delivery system, according to an embodiment of the present invention.

Referring now to FIG. 7, a block diagram illustrates a web content delivery system, according to an embodiment of the present invention. As shown, web content delivery system 700 inputs and processes web pages 702 in accordance with fragment detection system 704, web publishing system 706, and cache 708. More particularly, system 700 makes use of fragment detection system 704 to efficiently deliver web content comprised of a plurality of fragments. It is to be appreciated that fragment detection system 704 may implement one or more of the automated fragment detection methodologies described herein (e.g., in accordance with FIGS. 3-6). Alternatively, fragment detection system 704 could implement a different fragment detection methodology.

Figure 8:
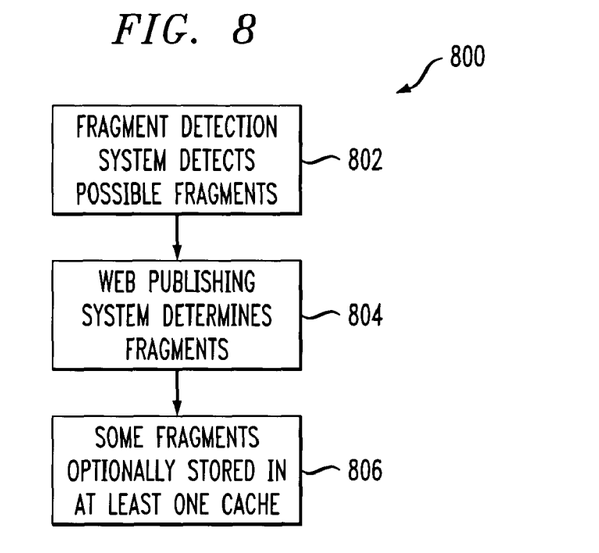
FIG. 8 is a flow diagram illustrating a web content delivery methodology, according to an embodiment of the present invention.

Referring now to FIG. 8, a flow diagram illustrates a web content delivery methodology, according to an embodiment of the present invention. For example, FIG. 8 may be considered as depicting a methodology for web publishing and delivery using the system depicted in FIG. 7. Thus, parenthetical reference will be made back to the components of FIG. 7.

As shown in step 802 of methodology 800, a fragment detection system (704) examines a plurality of web pages (702) and determines probable fragments from the web pages. Again, methods that may be used for detecting possible fragments in web pages are described in detail above. Thus, step 802 can be performed in accordance with these methods or with other methods as well.

In step 804, a web publishing system (706) examines possible fragments from the fragment detection system (704) and makes decisions about how the web pages should be fragmented. It may consider several factors in doing so including, but not limited to, the following:

Size: It may not be very profitable to generate fragments which are too small. Therefore, preference may be given to identifying fragments which are larger. Large fragments are desirable to identify because avoiding redundant storage of large fragments can result in significant reduction of storage requirements.

Lifetime: As discussed previously, a fragment detection system (704) may have the ability to estimate lifetimes of fragments. A web publishing system (706) may give preference to identifying fragments when doing so would result in fragments on the same web page with significantly different lifetimes. This could allow different parts of the same web page with significantly different lifetimes to be updated independently. When caching is being used, fragments which change frequently and thus have short lifetimes may be marked as being uncacheable or less desirable to cache.

Cost to generate: Preference may be given to identifying fragments which are expensive to generate. Using fragments for parts of web pages which are expensive to generate (and thus reducing redundant recalculations of these portions) may reduce computational overhead.

Step 806 is an optional step in which some fragments are stored in at least one cache (708). When a request for a complete web page stored in the form of fragments is received by a cache (708), the cache assembles the web page from fragments. If the cache does not have all of the fragments, it may have to obtain them from a remote source such as a server. Fragments which change very frequently might not be stored in cache. As mentioned previously, a fragment detection system (704) may have the ability to determine change frequencies of fragments.

A cache (708) might also be instructed not to cache personalized and/or confidential fragments. A key advantage of the fragment-based approach is that it can allow some parts of highly dynamic, personalized, and/or confidential web pages to be cached. By contrast, treating such web pages monolithically as a single entity might not allow any caching of such pages.

There are a number of variations on this methodology within the spirit and scope of the invention, non-limiting examples of which are now mentioned. The methodology may be applied to other electronic documents, not just web pages. A human being might also provide some input into the fragment detection process depicted in FIG. 8. The fragment detection process could proceed through multiple iterations in which web pages are sent to a fragment detection system multiple times with successive refinements, possibly with human intervention.

It is to be further appreciated that the present invention also comprises techniques for providing electronic document publishing services. By way of example, a publication service provider agrees (e.g., via a service level agreement or some informal agreement or arrangement) with a publication service customer or client to provide web page publishing and/or delivery services. That is, the service provider may host the customer's web site and associated applications (e.g., e-commerce applications). Then, in accordance with terms of the contract between the service provider and the service customer, the service provider provides publishing services which may comprise one or more of the methodologies of the invention described herein. By way of example, this may include automatically analyzing one or more electronic documents to determine a plurality of fragments comprising the one or more electronic documents, dividing the one or more electronic documents into the plurality of fragments, storing the plurality of fragments, and creating for publication at least one electronic document by assembling the at least one electronic document from at least a portion of the plurality of fragments. The contract may also specify terms for delivering the content.

Figure 9:
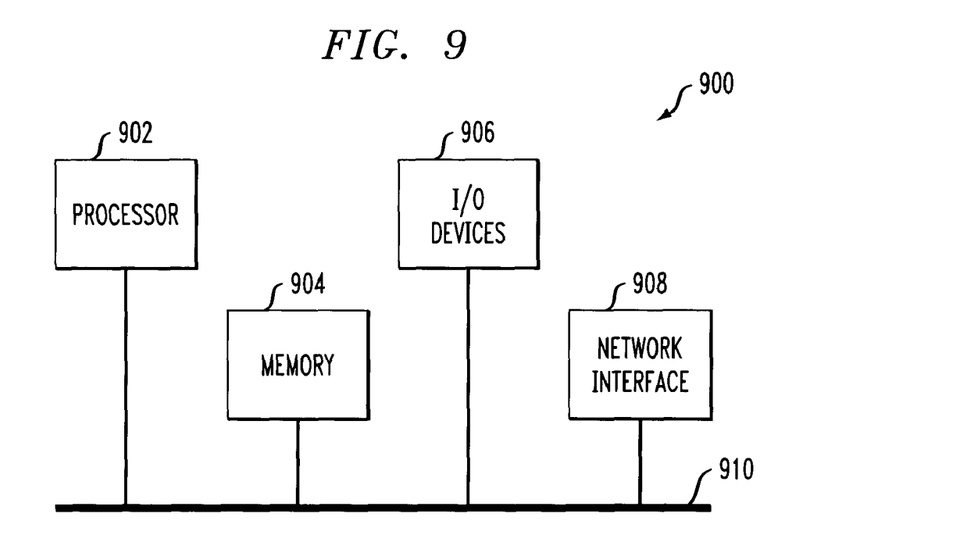
FIG. 9 is a block diagram illustrating an illustrative hardware implementation of a computing system in accordance with which one or more components of an automated fragment detection system may be implemented, according to an embodiment of the present invention.

Referring finally to FIG. 9, a block diagram illustrates an illustrative hardware implementation of a computing system in accordance with which one or more components/steps of an automated fragment detection system (e.g., methodologies described in the context of FIGS. 3 through 6 as may be performed on fragment detection system 110 of FIG. 1 and/or methodologies described in the context of FIG. 8 as may be performed in accordance with fragment detection system 704) may be implemented, according to an embodiment of the present invention. It is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

Also, it is to be understood that each of the other components illustrated in the figures (e.g., publishing system, application server, web server, database, cache) may be implemented as one or more of the components shown in FIG. 9.

As shown, the computer system 900 may be implemented in accordance with a processor 902, a memory 904, I/O devices 906, and a network interface 908, coupled via a computer bus 910 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of detecting similar subsets in at least one electronic document, comprising the steps of:
   parsing the at least one document into at least one tree comprised of a plurality of nodes;
   grouping nodes of the at least one tree based on sizes; and
   identifying at least one subset of a first node similar to at least one subset of a second node;
   wherein the steps are performed at least in part by a processor;
   wherein the at least one subset of the first node and the at least one subset of the second node are identified as similar responsive to (i) a determination that a size of at least one of the first and second nodes exceeds a first threshold and (ii) a determination that a similarity measure exceeds a second threshold; and
   wherein the node grouping step further comprises placing the nodes of the at least one tree in at least one bucket and sorting the nodes in the at least one bucket based on their sizes.

2. The method of claim 1, further comprising the step of pruning at least one node of the at least one tree.

3. The method of claim 1, wherein the at least one electronic document comprises one of an HTML document and an XML document.

4. The method of claim 1, wherein the identifying step further comprises using a content encoding mechanism for measuring the similarity of nodes.

5. The method of claim 4, wherein the content encoding mechanism comprises shingles.

6. The method of claim 5, wherein shingles of a given node are computed incrementally reusing the shingles of at least one child node of the given node.

7. The method of claim 1, wherein the identifying step further comprises comparing nodes beginning with a largest node so as to ensure detection of maximum sized similar subsets shared between electronic documents.

8. The method of claim 1, wherein the identifying step further comprises verifying that ancestor nodes of similar nodes have not been detected as belonging to a same similar subset.

9. The method of claim 1, wherein the similar subset is a shared fragment.

10. The method of claim 9, wherein the shared fragment may be a subset of at least one preexisting fragment.

11. A method of detecting similar subsets in a plurality of versions of an electronic document, comprising the steps of:
    parsing the plurality of versions into at least one tree comprised of a plurality of nodes;
    examining at least one node to determine a subset s1 of a first node similar to a subset s2 of a second node; and
    determining differences between subset s1 and subset s2;
    wherein the steps are performed at least in part by a processor;
    wherein subset s1 and subset s2 are identified as similar responsive to (i) a determination that a size of at least one of the first and second nodes exceeds a first threshold and (ii) a determination that a similarity measure exceeds a second threshold; and
    wherein the examining step further comprises placing the nodes of the at least one tree in at least one bucket and sorting the nodes in the at least one bucket based on their sizes.

12. The method of claim 11, further comprising the step of pruning at least one node of the at least one tree.

13. The method of claim 11, wherein the at least one electronic document comprises one of an HTML document and an XML document.

14. The method of claim 11, wherein the examining step further comprises using a content encoding mechanism for measuring the similarity of nodes.

15. The method of claim 14, wherein the content encoding mechanism comprises shingles.

16. The method of claim 15, wherein shingles of a given node are computed incrementally reusing the shingles of at least one child node of the given node.

17. The method of claim 11, wherein the examining step further comprises comparing nodes from the at least one tree beginning at the root node of the at least one tree.

18. The method of claim 11, wherein two similar nodes are chosen from two different versions of the document.

19. The method of claim 11, wherein at least one subset that changes in at least one of content and position is determined.

20. The method of claim 11, wherein subsets s1 and s2 are declared as fragments if they differ substantially.

21. The method of claim 1, further comprising the step of comparing nodes using an order based on sizes.

22. A method of detecting fragments in at least one electronic document, comprising the steps of:
    parsing the at least one document into at least one tree comprised of a plurality of nodes;
    identifying a plurality of fragments in which a fragment is comprised of at least one node;
    maintaining an ancestor fragment set for at least one node such that the ancestor fragment set identifies at least one fragment to which an ancestor of the node belongs; and
    determining a similarity between at least two fragments;
    wherein the steps are performed at least in part by a processor;
    wherein the at least two fragments are identified as similar responsive to (i) a determination that a size of at least one of the at least two fragments exceeds a first threshold and (ii) a determination that a similarity measure exceeds a second threshold; and
    wherein the identifying step further comprises placing the nodes of the at least one tree in at least one bucket and sorting the nodes in the at least one bucket based on their sizes.

23. The method of claim 22, further comprising the step of adding at least one node to an ancestor fragment set of at least one descendant of at least one node belonging to the ancestor fragment set.

24. The method of claim 22, further comprising the step of comparing the ancestor fragments sets of nodes in a fragment to ensure that the nodes have different ancestors.

25. The method of claim 22, further comprising the step of detecting fragments in which the nodes belonging to the fragment have different ancestors.

26. Apparatus for detecting similar subsets in at least one electronic document, comprising:
   a memory; and
   at least one processor coupled to the memory and operative to: (i) parse the at least one document into at least one tree comprised of a plurality of nodes; (ii) group nodes of the at least one tree based on sizes; and (iii) identify at least one subset of a first node similar to at least one subset of a second node;
   wherein the at least one subset of the first node and the at least one subset of the second node are identified as similar responsive to (i) a determination that a size of at least one of the first and second nodes exceeds a first threshold and (ii) a determination that a similarity measure exceeds a second threshold; and
   wherein the node grouping operation further comprises placing the nodes of the at least one tree in at least one bucket and sorting the nodes in the at least one bucket based on their sizes.

27. Apparatus for detecting similar subsets in a plurality of versions of an electronic document, comprising:
   a memory; and
   at least one processor coupled to the memory and operative to: (i) parse the plurality of versions into at least one tree comprised of a plurality of nodes; (ii) examine at least one node to determine a subset s1 of a first node similar to a subset s2 of a second node; and (iii) determine differences between subset s1 and subset s2;
   wherein subset s1 and subset s2 are identified as similar responsive to (i) a determination that a size of at least one of the first and second nodes exceeds a first threshold and (ii) a determination that a similarity measure exceeds a second threshold; and
   wherein the examining operation further comprises placing the nodes of the at least one tree in at least one bucket and sorting the nodes in the at least one bucket based on their sizes.

28. Apparatus for detecting fragments in at least one electronic document, comprising:
   a memory; and
   at least one processor coupled to the memory and operative to: (i) parse the at least one document into at least one tree comprised of a plurality of nodes; (ii) identify a plurality of fragments in which a fragment is comprised of at least one node; (iii) maintain an ancestor fragment set for at least one node such that the ancestor fragment set identifies at least one fragment to which an ancestor of the node belongs; and (iv) determine a similarity between at least two fragments;
   wherein the at least two fragments are identified as similar responsive to (i) a determination that a size of at least one of the at least two fragments exceeds a first threshold and (ii) a determination that a similarity measure exceeds a second threshold; and
   wherein the identifying operation further comprises placing the nodes of the at least one tree in at least one bucket and sorting the nodes in the at least one bucket based on their sizes.

29. An article of manufacture for detecting similar subsets in at least one electronic document, comprising a machine readable storage medium containing one or more programs which when executed implement the steps of:
   parsing the at least one document into at least one tree comprised of a plurality of nodes;
   grouping nodes of the at least one tree based on sizes; and
   identifying at least one subset of a first node similar to at least one subset of a second node;
   wherein the at least one subset of the at least one node and the at least one subset of the another node are identified as similar responsive to a responsive to (i) a determination that a size of at least one of the first and second nodes exceeds a first threshold and (ii) a determination that a similarity measure exceeds a second threshold; and
   wherein the node grouping step further comprises placing the nodes of the at least one tree in at least one bucket and sorting the nodes in the at least one bucket based on their sizes.

30. An article of manufacture for detecting similar subsets in a plurality of versions of an electronic document, comprising a machine readable storage medium containing one or more programs which when executed implement the steps of:
   parsing the plurality of versions into at least one tree comprised of a plurality of nodes;
   examining at least one node to determine a subset s1 of a first node similar to a subset s2 of a second node; and
   determining differences between subset s1 and subset s2;
   wherein subset s1 and subset s2 are identified as similar responsive to (i) a determination that a size of at least one of the first and second nodes exceeds a first threshold and (ii) a determination that a similarity measure exceeds a second threshold; and
   wherein the examining step further comprises placing the nodes of the at least one tree in at least one bucket and sorting the nodes in the at least one bucket based on their sizes.

31. An article of manufacture for detecting fragments in at least one electronic document, comprising a machine readable storage medium containing one or more programs which when executed implement the steps of:
   parsing the at least one document into at least one tree comprised of a plurality of nodes;
   identifying a plurality of fragments in which a fragment is comprised of at least one node;
   maintaining an ancestor fragment set for at least one node such that the ancestor fragment set identifies at least one fragment to which an ancestor of the node belongs; and
   determining a similarity between at least two fragments;
   wherein the at least two fragments are identified as similar responsive to (i) a determination that a size of at least one of the at least two fragments exceeds a first threshold and (ii) a determination that a similarity measure exceeds a second threshold; and
   wherein the identifying step further comprises placing the nodes of the at least one tree in at least one bucket and sorting the nodes in the at least one bucket based on their sizes.

32. A system for detecting candidate fragments in at least one web page, comprising a processor operative to implement:
   a candidate fragment detector operative to: (i) construct a tree-based structure for the at least one web page; and (ii)

detect candidate fragments in the at least one web page, using the tree-based structure, based on web page related criterion comprising one or more of information sharing behavior, at least one personalization characteristic, and a change pattern over time, wherein candidate fragments comprise similar subsets recurring in the at least one web page;

wherein the subsets are identified as similar responsive to (i) a determination that a size of at least one of the subsets exceeds a first threshold and (ii) a determination that a similarity measure exceeds a second threshold; and wherein the detecting operation further comprises placing nodes of the tree-based structure in at least one bucket and sorting the nodes in the at least one bucket based on their sizes.

* * * * *

UNITED STATES PATENT AND TRADEMARK OFFICE
CERTIFICATE OF CORRECTION

| | |
|---|---|
| PATENT NO. | : 8,037,081 B2 |
| APPLICATION NO. | : 10/458561 |
| DATED | : October 11, 2011 |
| INVENTOR(S) | : Douglis et al. |

It is certified that error appears in the above-identified patent and that said Letters Patent is hereby corrected as shown below:

On the Title page:

On page 1, in Item (75), please change "Arun Kwangil Ivengar" to --Arun Kwangil Iyengar--.

Signed and Sealed this
Twenty-ninth Day of November, 2011

David J. Kappos
*Director of the United States Patent and Trademark Office*